(12) United States Patent
Lee et al.

(10) Patent No.: US 11,545,875 B2
(45) Date of Patent: Jan. 3, 2023

(54) MOTOR PROVIDED WITH COOLING SYSTEM

(71) Applicants: Hyundai Motor Company, Seoul (KR); Kia Motors Corporation, Seoul (KR)

(72) Inventors: Jae Hyeon Lee, Hwaseong-si (KR); Jeong Bin Yim, Incheon (KR); Jin Ho Kim, Incheon (KR); Tae Kil Kim, Hwaseong-si (KR); Dae Woong Han, Anyang-si (KR); Ji Wan Cha, Incheon (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 233 days.

(21) Appl. No.: 16/899,031

(22) Filed: Jun. 11, 2020

(65) Prior Publication Data
US 2021/0050764 A1 Feb. 18, 2021

(30) Foreign Application Priority Data
Aug. 14, 2019 (KR) .......................... 10-2019-0099594

(51) Int. Cl.
*H02K 9/193* (2006.01)
*H02K 9/14* (2006.01)

(52) U.S. Cl.
CPC ..................................... *H02K 9/193* (2013.01)

(58) Field of Classification Search
CPC ............ H02K 9/19; H02K 9/193; H02K 1/20; H02K 3/24; H02K 5/20; H02K 9/14

USPC ................................. 310/52, 54, 57, 59, 260
See application file for complete search history.

(56) References Cited

U.S. PATENT DOCUMENTS

| | | | | |
|---|---|---|---|---|
| 2011/0140551 | A1* | 6/2011 | Adaniya ............... | H02K 9/197 310/64 |
| 2012/0062056 | A1 | 3/2012 | Bradfield | |
| 2014/0217842 | A1* | 8/2014 | Kikuchi ................. | H02K 9/19 310/54 |
| 2014/0346905 | A1* | 11/2014 | Matsui ................... | H02K 5/203 310/54 |
| 2017/0250591 | A1* | 8/2017 | Hanumalagutti ........ | H02K 9/19 |

FOREIGN PATENT DOCUMENTS

| | | | |
|---|---|---|---|
| JP | 2005130588 A | * | 5/2005 |
| JP | 2005130588 A | | 5/2005 |
| KR | 20130108347 A | | 10/2013 |

OTHER PUBLICATIONS

JP-2005130588-A (English Translation) (Year: 2005).*

* cited by examiner

*Primary Examiner* — Jose A Gonzalez Quinones
(74) *Attorney, Agent, or Firm* — Slater Matsil, LLP

(57) ABSTRACT

A motor is provided. The motor includes a cooling system configured to cool a stator having a core wound around by a coil, wherein the cooling system includes oil holders installed on a side under the stator in an inner space of a motor housing and provided to allow oil to be collected up to a level capable of allowing at least some of a lower end section of the stator to be immersed for cooling.

20 Claims, 16 Drawing Sheets

------▶ : Oil supply direction

- - - - → : Oil spray direction

MOTOR PROVIDED WITH COOLING SYSTEM

CROSS-REFERENCE TO RELATED APPLICATIONS

This application claims priority to Korean Patent Application No. 10-2019-0099594, filed on Aug. 14, 2019, which application is hereby incorporated herein by reference.

TECHNICAL FIELD

The present invention relates to a motor provided with a cooling system.

BACKGROUND

As is known, eco-friendly vehicles including a pure electric vehicle (EV), a hybrid electric vehicle (HEV/PHEV), and a fuel cell electric vehicle (FCEV) are all electric vehicles driven by electric motors.

The eco-friendly vehicle is equipped with a motor which is a driving source for driving a vehicle, and an inverter which converts direct current (DC) current from a high voltage power source into alternating current (AC) current and applies the AC current to the motor, thereby driving and controlling the motor.

As described above, in the eco-friendly vehicle, a driving force for driving a vehicle is generated using a motor.

In the case of the motor, which drives an eco-friendly vehicle, that is, a driving motor, high efficiency and high power density are required.

The driving motor efficiency is known to be about 90% in recently developed eco-friendly cars, and much of the remaining 10% is lost as heat.

Such a loss of heat may cause the motor system, including a stator and a rotor, to exceed a specified allowable motor temperature. Here the allowable motor temperature is a preset allowable temperature that may prevent the temperature of the motor system to be exceeded in order to prevent a demagnetization phenomenon of permanent rotor magnets, damage by overheating of stator coils, or the like.

When the temperature of the motor system exceeds the allowable motor temperature, the damage by overheating of the stator coils or the like, the demagnetization of the permanent rotor magnets, damage of rotor molding, or the like may occur.

Therefore, in order to meet a demand necessary for miniaturization, high output, and high efficiency of the motor, which are continuously required, it is essential to have a stable thermal management system.

Since a large amount of heat is generated from the coils and the like when driving the motor, cooling of the main parts such as the coils and the like is essential. In this sense, cooling of an interior permanent magnet synchronous motor (IPSM), which is widely used as a driving motor of the vehicle, plays a major role in enhancing the efficiency of the motor and protecting core parts (a permanent magnet, coils, and the like).

When the temperature of the permanent magnet becomes at least a certain level, the demagnetization of the permanent magnet may occur and the strength of the magnetic force may become weak, thereby greatly affecting the efficiency of the motor.

As a result, in order to prevent the motor system from reaching an over temperature state exceeding the allowable temperature of the motor, or the demagnetization occurring in the permanent magnet of the motor, thermal management of the motor system is necessary. In this sense, a thermal management system is required to be provided.

Thermal management systems for motors, in particular, cooling systems, may be classified into air cooling system, water cooling system, and oil cooling system according to the coolant; and may be classified into a splash lubrication system using a motor rotation and a forced lubrication system using an electric oil pump (EOP) according to the injection method.

In addition, the motor cooling system may even be classified into a direct cooling method and an indirect cooling method. In recent years, the direct cooling method has been widely used due to a demand for high cooling performance. Cases where injection cooling of the forced lubrication system using oil pressure of the EOP and cooling of a shaft splash lubrication system are used at the same time are also being increased.

Furthermore, various studies for cooling optimization are being actively conducted on improving motor and housing shapes, improving cooling injection structures, or developing cooling supporting structures.

However, in a driving motor of a vehicle using direct cooling by oil, a certain part of the motor may be burned out caused by over temperature due to the uneven distribution of cooling oil. Meanwhile, since temperature sensing in all areas of the motor is not possible even though over temperature protection logic is applied, there is still a risk that certain overheated areas may be burned out.

Damage by overheating of the motor parts appears at a vulnerable cooling portion, and in general, a lower end portion of the stator, where the cooling oil does not reach well, becomes the vulnerable cooling portion.

Accordingly, there is a need for an efficient cooling technology that allows the oil to be evenly distributed along with the real-time temperature modeling technology by area.

In conventional art, some of the oil sprayed into the motor parts such as the stator and the like through holes of an injection pipe in an inner space of the motor housing is allowed to be collected in a lower side of the inner space of the housing, whereby a lower end portion of the stator is allowed to be immersed into the oil collected in the lower side of the inner space of the housing. Accordingly, cooling of the lower end portion of the stator, which is in a state of being immersed into the oil, may be achieved.

However, when the motor is tilted during driving of the vehicle, the lower end portion of the stator may not be immersed into the oil, and cooling may not be achieved. As a result, a problem due to poor cooling may occur.

The foregoing is intended merely to aid in the understanding of the background of the present invention and is not intended to mean that the present invention falls within the purview of the related art that is already known to those skilled in the art.

SUMMARY

The present invention relates to a motor and, more particularly, to a motor that is capable of cooling parts more efficiently using oil.

Accordingly, embodiments of the present invention solve problems in the art. An embodiment of the present invention provides a motor cooling system that can cool parts more efficiently using oil and provides a motor provided with the motor cooling system.

One embodiment of the present invention provides a motor including a cooling system configured to cool a stator having a core wound around by a coil, wherein the cooling system includes oil holders installed on a side under the stator in an inner space of a motor housing and provided to allow oil to be collected up to a level capable of allowing at least some of a lower end section of the stator to be immersed for cooling.

Thus, according to the motor according to an embodiment of the present invention, an oil holder, which can collect and store oil, is additionally installed on the side under the stator in the inner space of the housing.

Accordingly, even when the motor is tilted during slope way driving or due to vehicle behavior, vulnerable cooling portions such as a lower end portion of the stator and, especially, a lower end portion of the stator coil can be kept at all times in a state of being immersed into the oil inside the oil holder in the housing.

As a result, a conventional problem in which vulnerable cooling portions such as the lower end portion of the stator and the like appear due to the tilt of the motor, and a problem in which the rotor immersion into the oil due to the tilt of the motor occurs, thereby causing additional drag, can be solved.

In addition, a problem of designing a motor-reducer housing and limiting an amount of the oil, in consideration of a gear loss, can be solved. Further, a cooling effect by immersion into the oil at all times can be sufficiently exercised regardless of the shape of the motor-reducer housing.

In addition, overall cooling performance and the cooling effect on the motor can be greatly improved, more efficient and superior motor cooling can be realized compared to conventional art, and the oil pump can be operated more advantageously. As a result, while the advantage is provided even in terms of electric loads, vehicle fuel economy can be improved as a whole.

BRIEF DESCRIPTION OF THE DRAWINGS

The above and other objectives, features, and other advantages of embodiments of the present invention will be more clearly understood from the following detailed description when taken in conjunction with the accompanying drawings, in which.

DETAILED DESCRIPTION OF ILLUSTRATIVE EMBODIMENTS

Figure 1:
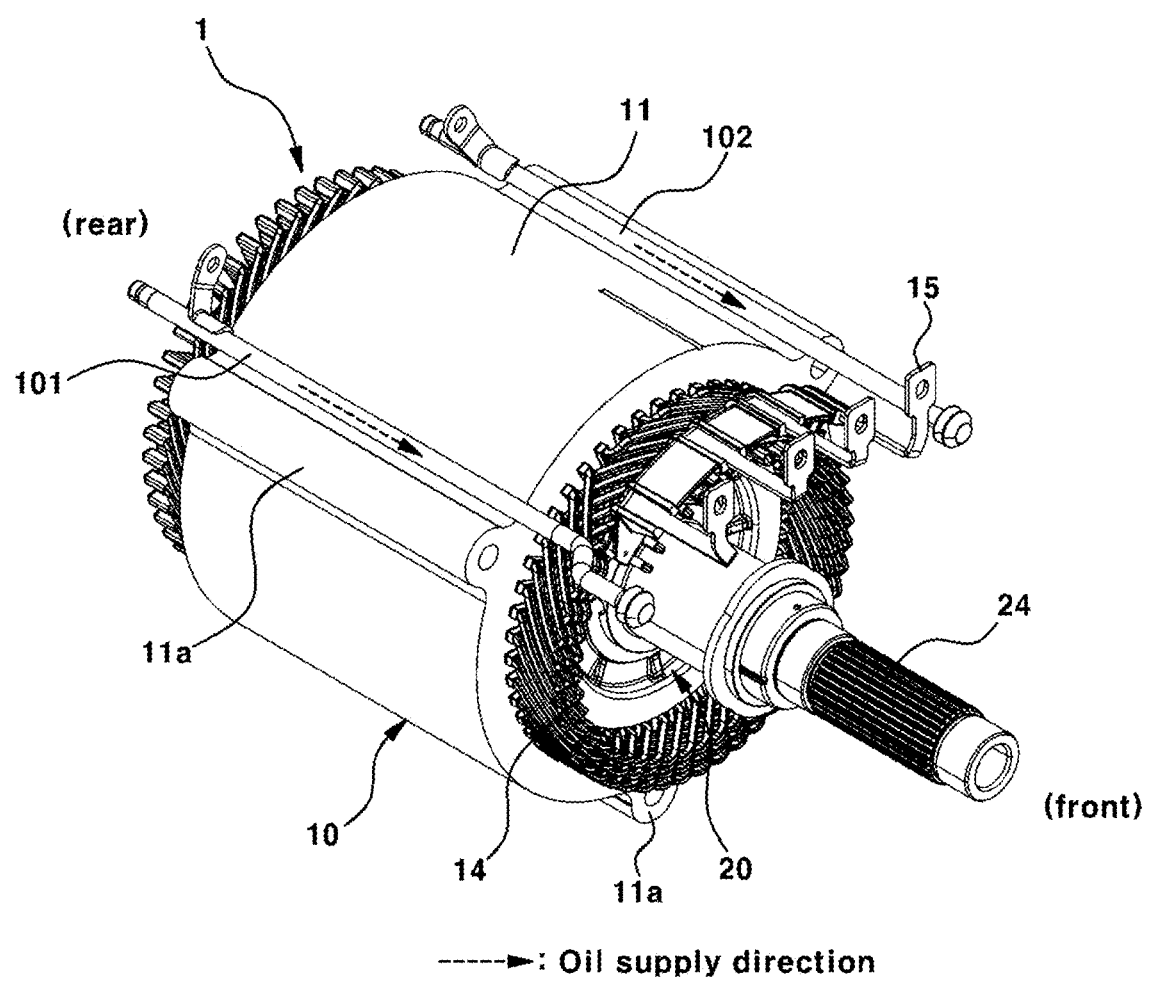
FIGS. 1 to 3 are views showing a conventional motor and a cooling system thereof.

Hereinafter, exemplary embodiments of the present invention will be described in detail with reference to the accompanying drawings so that those skilled in the art may easily implement the present invention. Throughout the drawings, the same reference numerals will refer to the same or like parts. However, the present invention is not limited to the embodiments described herein and may be embodied in other forms.

When any part of the specification is to "include" any component, this means that, unless specifically stated otherwise, it may further include other components rather than excluding the other components.

First, a conventional motor cooling system and problems thereof will be briefly described to aid in understanding the embodiments of the present invention.

Figure 2:
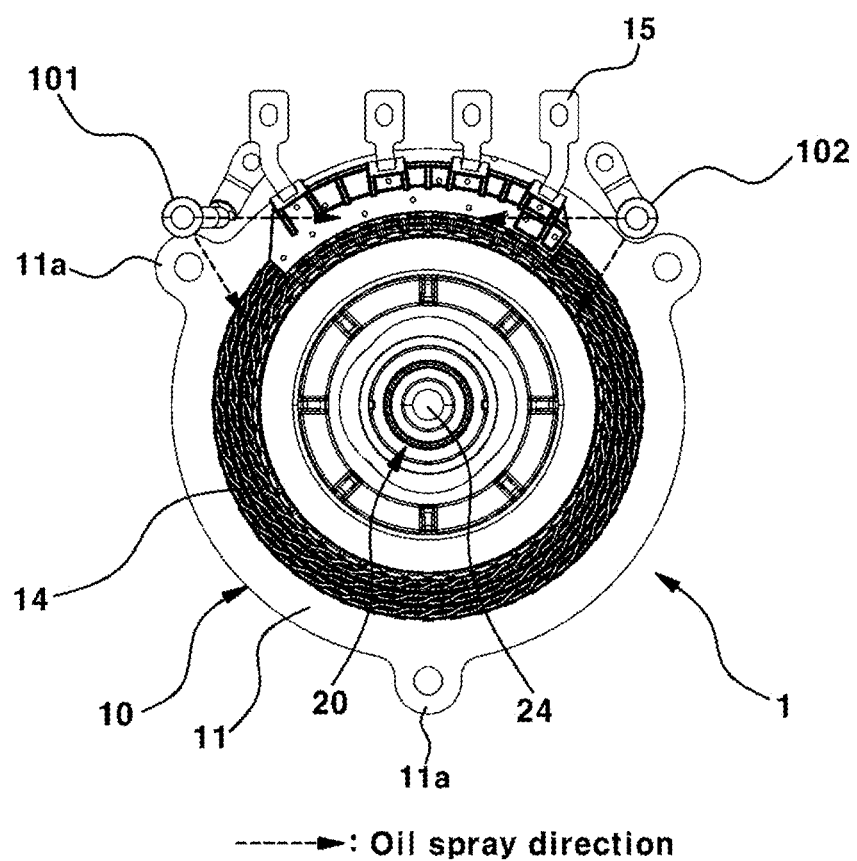
Figure 3:
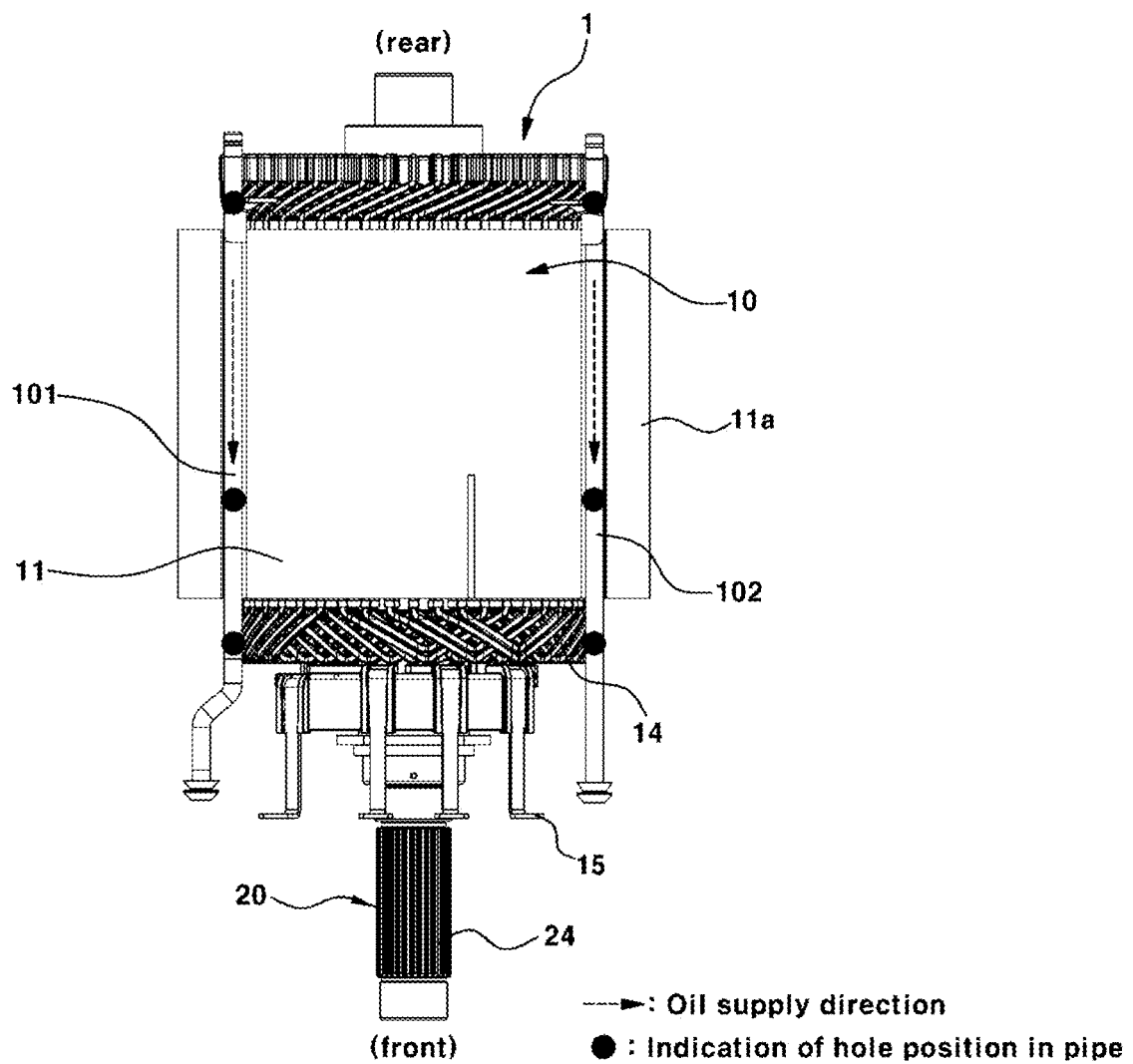

FIGS. 1 to 3 are views showing a conventional motor and a cooling system thereof. In particular, FIG. 1 is a perspective view of the motor and the cooling system thereof, FIG. 2 is a front view of the motor and cooling system thereof, and FIG. 3 is a plan view of the motor and cooling system thereof.

In the following description, as shown in FIGS. 1 and 3, a protruding side of a shaft 24 of a rotor 20 from a motor 1 is called 'front', and the opposite side thereof is called 'rear'.

In FIGS. 1 to 3, an illustration of a motor housing is omitted. However, the motor housing is provided such that motor parts such as a stator, a rotor, and the like may be accommodated in an inner space thereof and is a component located outward so as to surround the illustrated stator 10 and the rotor 20.

In addition, in FIGS. 1 to 3, an illustration of an oil pump is omitted. However, each of the illustrated injection pipes 101 and 102 is connected to the oil pump through a pipeline such as a hose or pipe which is not shown.

In addition, injection pipes 101 and 102 are provided with holes at a predetermined interval along the longitudinal direction so that oil may be sprayed toward a stator 10 located on a side below thereof. Accordingly, when oil, which is transferred by being pressurized by the oil pump, is supplied to the injection pipes 101 and 102 through the pipeline, the oil may be sprayed to the motor parts such as the stator 10 and the like through the holes of the injection pipes 101 and 102.

Figure 4:
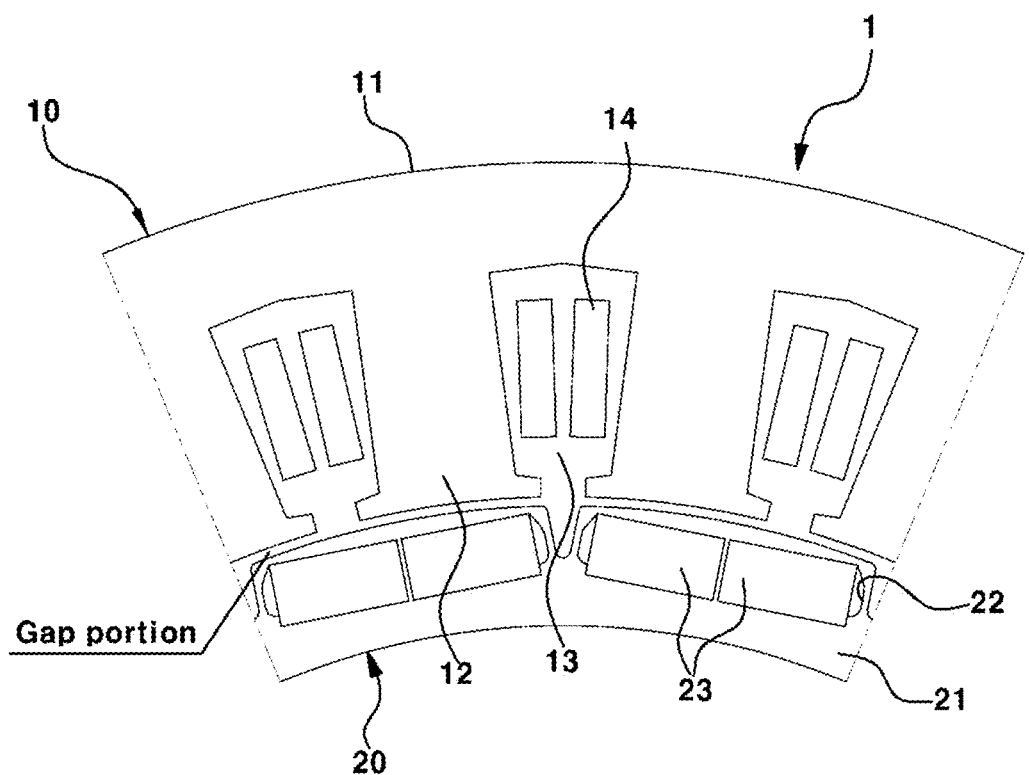
FIG. 4 is a sectional view showing a known motor configuration.

Meanwhile, FIG. 4 is a sectional view representing a known motor configuration and shows a configuration of an interior permanent magnet synchronous motor (IPMSM) widely used as a driving motor of an eco-friendly vehicle.

As a driving motor, which becomes a driving source of the eco-friendly vehicle, a permanent magnet synchronous motor may be used, and, more specifically, the IPMSM in which a permanent magnet is embedded in the rotor may be used.

As shown in FIG. 4, the permanent magnet synchronous motor includes a stator 10 and a rotor 20.

Here, the stator 10 may include a core 11 and a coil 14 wound around tooth portions 12 of the core 11, and the rotor 20 may include a core 21 and permanent magnets 23 embedded in or attached to the core 21.

With reference to FIG. 4, it may be seen that the tooth portions 12 are provided at a predetermined interval over the entire circumference along the circumferential direction at an inner side of the stator core 11. In the meantime, a slot 13 is provided and arranged between each adjacent tooth portion 12.

In addition, the tooth portions 12 are wound around by the coil 14. At this time, the coil 14 winds around the tooth portions 12 through the slots 13, whereby the coil 14 in the stator core 11 is accommodated inside the slots 13 in a state of being wound around the tooth portions 12.

Meanwhile, the rotor 20 is arranged inside the stator 10 so as to have a gap portion between the rotor 20 and the stator core 11. In addition, the insertion holes 22 are provided in the rotor core 21 along the circumferential direction, and permanent magnets 23 are inserted into and installed in a respective insertion hole 22 of the rotor core 21.

Shown in the cooling system of FIGS. 1 to 3 is a manner, in which oil supplied from the pump not shown is injected through holes of the injection pipes 101 and 102, used to cool the motor parts such as the stator 10 and the like.

However, in a conventional cooling method, when the oil is injected from the injection pipes 101 and 102 located at an upper side, thereby cooling the motor, a lower end portion of the stator 10 becomes a vulnerable cooling portion where oil sprayed from the injection pipes 101 and 102 does not reach well. Therefore, damage by overheating may occur at the lower end portion of the stator, specifically, at the lower end portion of the stator coil 14.

Accordingly, in order to enhance cooling performance at the lower end portion of the stator, which is the vulnerable cooling portion, a shaft splash lubrication system is used or a structure allowing immersion into the oil by the housing is used.

Of these, the structure allowing immersion into the oil is for a cooling method that allows the oil sprayed from the injection pipes 101 and 102 to be collected in the lower space of the housing up to a level into which the lower end portion of the stator 10 may be immersed.

That is, the oil sprayed from the injection pipes 101 and 102 is collected at the lower side of the inner space of the housing after cooling down the motor parts such as the stator 10 and the like and then is discharged to the outside through the outlet of the housing. In the above process, the sprayed oil is preferred not to be discharged immediately through the outlet, and the oil having at least a certain level is imposed to be collected in the lower space in the housing. Accordingly, the lower end portion of the stator, which is the vulnerable cooling portion, is to be immersed into the oil collected in the lower space in the housing, thereby allowing cooling of the lower end portion of the stator to be accomplished.

However, according to the conventional structure allowing immersion into the oil through the housing, the oil needs to be always collected and filled in a volume as much as required inside the lower end portion of the housing so that the lower end portion of the stator may be immersed into the inner space of the housing at all times.

However, when the motor is tilted due to the vehicle behavior in the pitch or roll direction during the driving of the vehicle, an aspect in which the motor parts such as the stator and the like are immersed into the oil varies greatly.

That is, when the driving state of the vehicle is a straight driving state where the motor is not tilted, the lower end portion of the stator (the lower end portion of the stator coil) may be immersed into the oil in the housing at both the front side portion and the rear side portion of the motor.

However, even though the oil height, into which the motor parts such as the stator and the like are to be immersed into, is properly set in the housing, the motor may be tilted to the front side or to the rear side. In this case, the coil on the side being tilted may be immersed much into the oil, but the coil on the opposite side may not be immersed into the oil at all.

In addition, on the side being tilted, not only the coil is immersed into the oil but also the rotor may be immersed into the oil. When the rotor, being rotated, is in a state being immersed into the oil during driving of the motor in the inner space of the housing, the oil may act as a resistance to the rotor and cause additional drag (loss), thereby leading the fuel economy to be reduced.

In addition, when a reducer is applied, parts of the motor and the reducer are accommodated in each corresponding housing, thereby constituting a structure that the housing is surrounding the parts of the motor and the reducer.

At this time, in designing the motor-reducer housing, the oil needs to be capable of being filled to a certain level inside the housing in order to obtain a sufficient cooling effect by the immersion into the oil. However, in this case, the reducer becomes excessively immersed into the oil, whereby the gear loss due to the oil becomes too large. Therefore, the motor-reducer housing is practically being designed to allow the oil to be filled up to below the certain level.

Since the motor-reducer housing has to be designed in such a limited vehicle space, an amount of the oil has to be limited in consideration of the gear loss. Accordingly, cases where targeted immersion into the oil and cooling effect are not obtained are being increased.

Therefore, in order to solve problems in the art, in embodiments of the present invention, a separate structure that may store the oil at the side under the stator in the inner space of the housing is additionally installed. As a result, even when the motor is tilted due to the vehicle behavior, the vulnerable cooling portion, such as the lower end section of the stator, especially the lower end portion of the stator coil, is allowed to be immersed at all times into the oil in the housing.

Accordingly, it is possible to resolve the problem wherein the rotor is immersed into the oil due to the tilt of the motor, while implementing a more efficient and superior motor cooling system. In addition, it is possible to provide sufficient cooling effect to be exercised at all times by the immersion into the oil regardless of the shape of the motor-reducer housing.

Hereinafter, a configuration of a motor and a cooling system thereof according to embodiments of the present invention will be described in detail with reference to the accompanying drawings.

Figure 5:
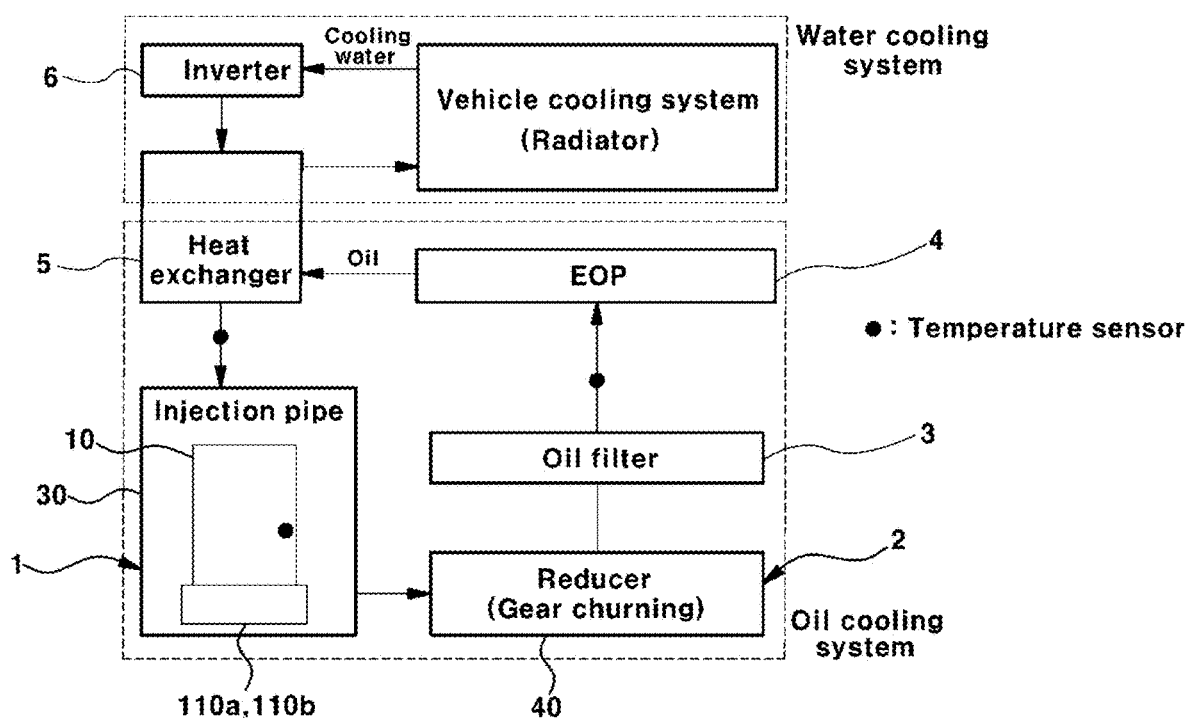
FIG. 5 is a block diagram showing a cooling system of a vehicle along with a motor according to an exemplary embodiment of the present invention.

FIG. 5 is a block diagram showing a cooling system of a vehicle along with a motor according to an exemplary embodiment of the present invention, where an electric oil pump is represented by an EOP 4. An electric water pump (EWP) is included in the water cooling system.

As is shown, along with a water cooling system of the vehicle using cooling water, an oil cooling system of the vehicle using oil is shown. Here, the cooling water is designed to be circulated between heating elements such as a radiator, an inverter 6, and the like and a heat exchanger 5 by the electric water pump, and the oil is designed to be circulated in a path between the heat exchanger 5, a motor 1, a reducer 2, and an oil filter 3 by the EOP 4.

In addition, in the embodiment of the present invention, in an inner space of a housing 30 of the motor 1, separate oil holders 110a and 110b, which temporarily store the oil so that the lower end section of the stator 10 may be cooled in a state of being immersed into the oil, are installed.

Eventually, the oil, which is transferred by being pressurized by the EOP 4, is cooled by heat exchange with the cooling water in the heat exchanger 5. Subsequently, the oil cooled in the heat exchanger 5 moves to the motor 1, thereby being sprayed into the motor parts such as the stator 10 and the like through the injection pipes 101 and 102 disposed inside the housing 30 of the motor 1.

In addition, the oil, which has cooled the motor 1, moves to an interior of a housing 40 of the reducer 2, thereby allowing cooling of the reducer by gear churning to be accomplished. Next, the oil discharged from the housing 40 of the reducer 2 is sucked into the EOP 4 after passing through the oil filter 3.

In this way, the oil is circulated along the preset path of the cooling system (oil cooling system) by suction and pressurized-transfer by the EOP 4, and the oil, which has finished cooling in the motor 1 and the reducer 2, is sucked into the EOP 4 after impurities are removed therefrom during passing through the oil filter 3.

In addition, in the motor 1 according to the embodiment of the present invention, the oil holders 110*a* and 110*b*, which are separate structures for collecting the oil to the side under the stator 10 inside the housing 30, are each provided at the front and rear sides of the motor.

The oil holders 110*a* and 110*b* are installed in a space between the lower end portion of the stator core and the lower end portion of the housing even in the inner space of the housing 30, wherein the oil holders 110*a* and 110*b* may be coupled and fixed together to the coupling portion between the stator core and the housing.

The oil holders 110*a* and 110*b* are provided to allow the oil, which moves downward after having been sprayed through the holes of the injection pipes 101 and 102, to be temporarily collected in the interior space of the housing 30. More specifically, the oil holders 110*a* and 110*b* are configured to be provided with an inner space capable of collecting the oil, that is, an oil storage space.

In addition, each of the oil holders 110*a* and 110*b* in embodiments of the present invention serves as an oil dam, which may trap an amount of the oil that may cool the lower end section of the stator at the lower side of the stator 10, and is provided with side surface portions (denoted by reference numeral "111" in FIG. 11) and a bottom portion (denoted by reference numeral "114" in FIG. 11) so as to trap the oil.

In addition, the oil holders 110*a* and 110*b* in embodiments of the present invention may be provided with a structure in which one side is open, whereby the oil discharged through the open portion of the oil holders 110*a* and 110*b* is allowed to move to the lower end portion of the inner space of the housing 30 of the motor 1 and then to the inner space of the housing 40 of the reducer 2.

As such, the oil holders 110*a* and 110*b* located at the side under the stator 10 are installed at the lower portion of the inner space of the housing 30 of the motor 1. Therefore, regardless of the vehicle body behavior and the tilt of the motor, the oil may be collected up to a level into which the lower end section of the stator is immersed at all times by the oil holders, which are in the inner space of the motor housing, whereby the effect of the cooling performance due to the immersion into the oil may be sufficiently exercised.

In particular, since at least some of the lower end portion of the stator 10 and, more specifically, of the lower end portion of the stator coil 14 may be cooled in a state of being immersed into the oil, which is filled in the oil holders 110*a* and 110*b*, the damage by overheating of the stator coil and the like may be effectively prevented. In addition, regardless of a housing shape or an oil level setting, it may greatly increase the cooling performance for existing vulnerable cooling portions without fear of additional rotor drag (loss).

Figure 6:
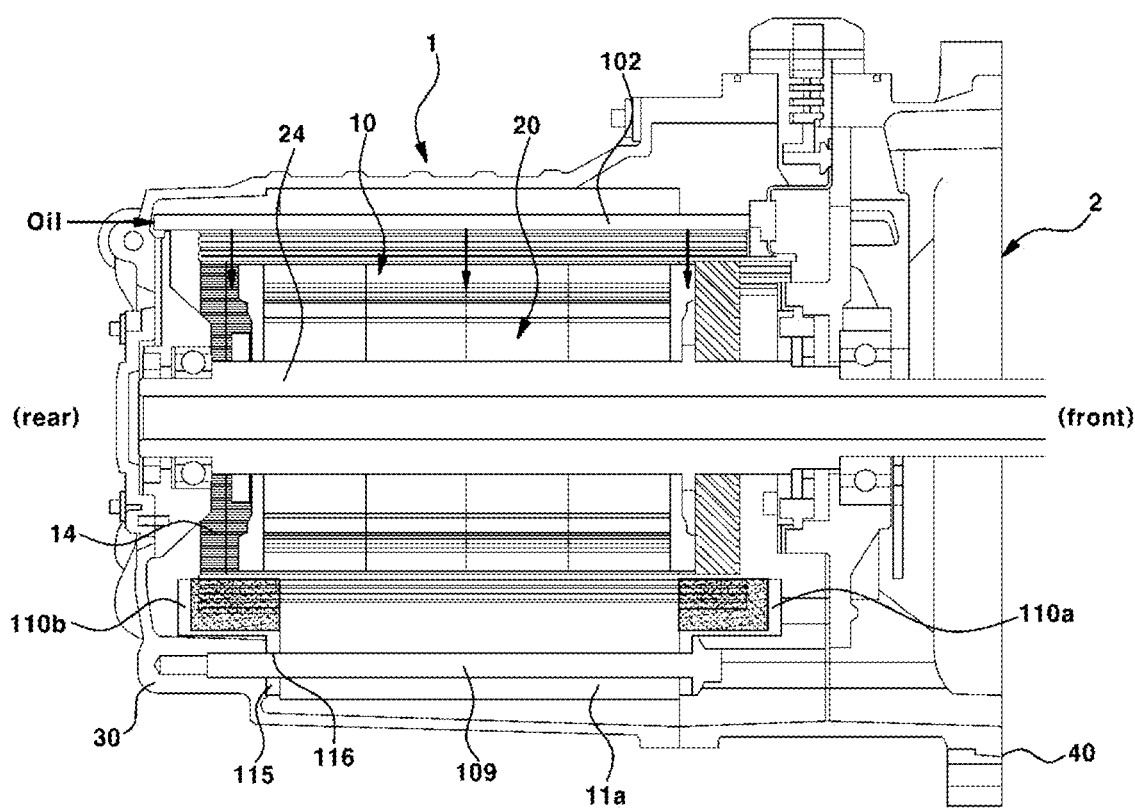
FIG. 6 is a sectional view showing a motor according to an embodiment of the present invention.

Next, FIG. 6 is a sectional view showing a motor according to an embodiment of the present invention.

In FIG. 6, reference numeral 2 denotes the reducer, reference numeral 30 denotes the motor housing, and reference numeral 40 denotes the reducer housing.

Figure 7:
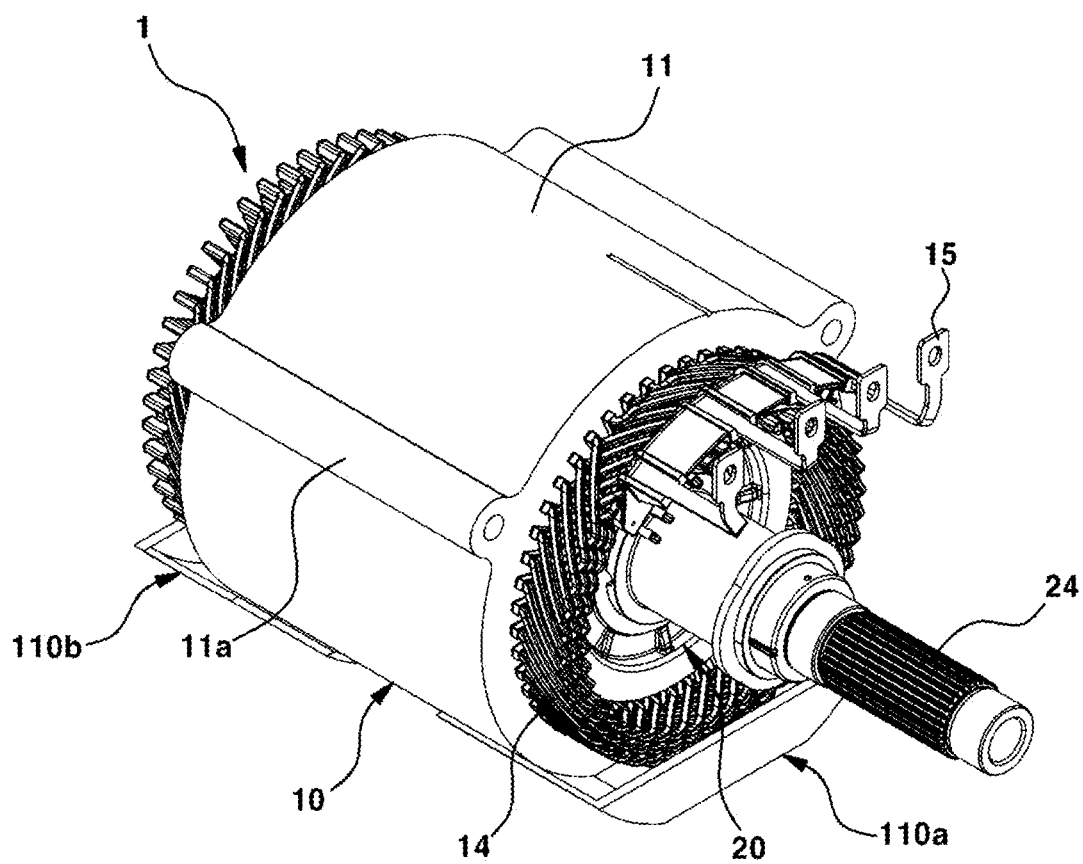
FIGS. 7 to 10 are views showing a state in which an oil holder is installed in the motor according to an embodiment of the present invention.
Figure 8:
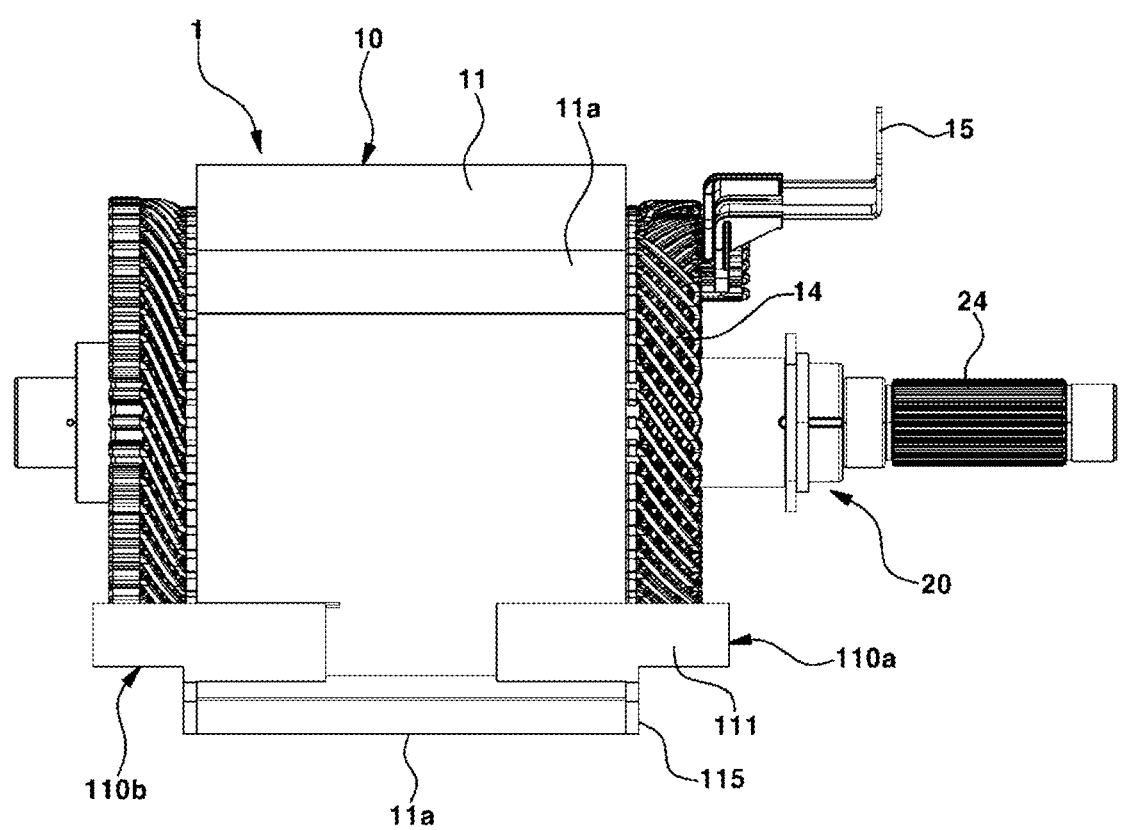
Figure 9:
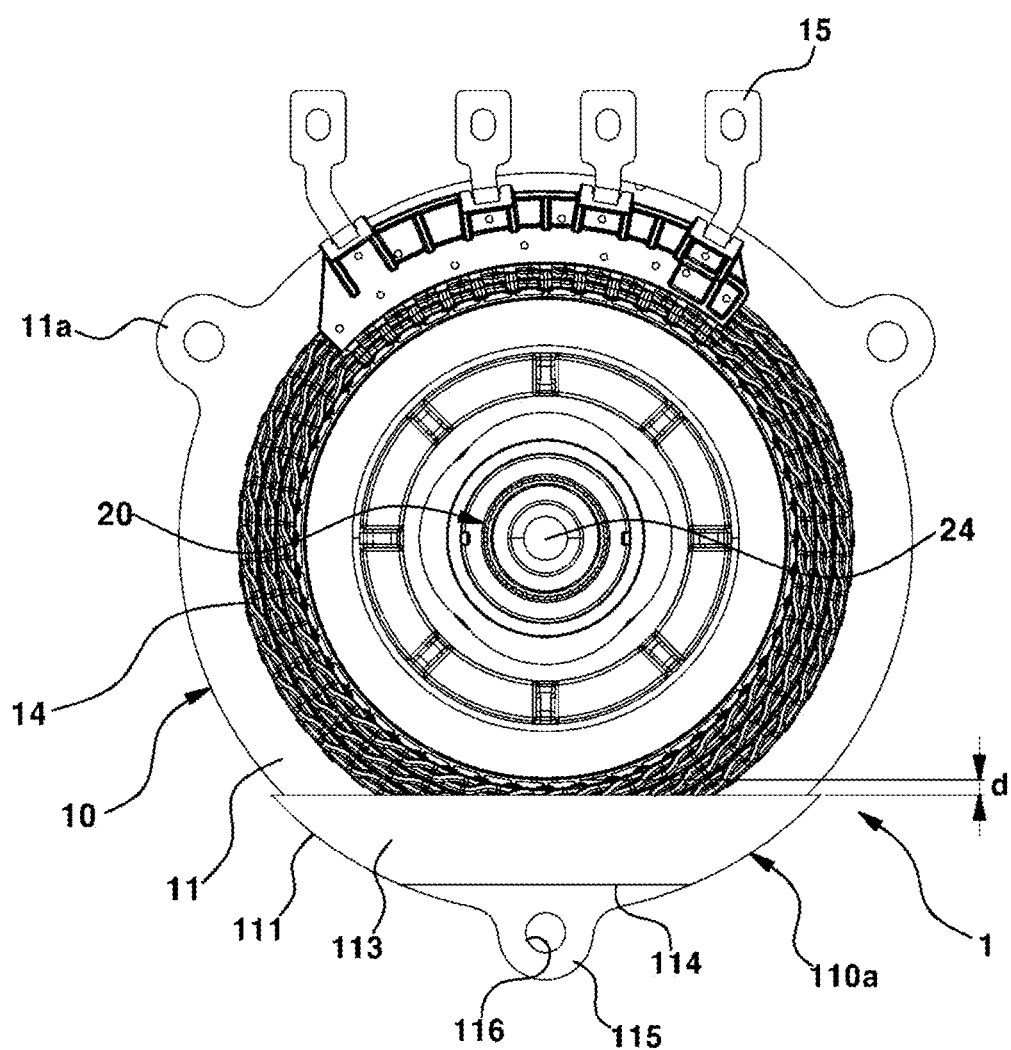
Figure 10:
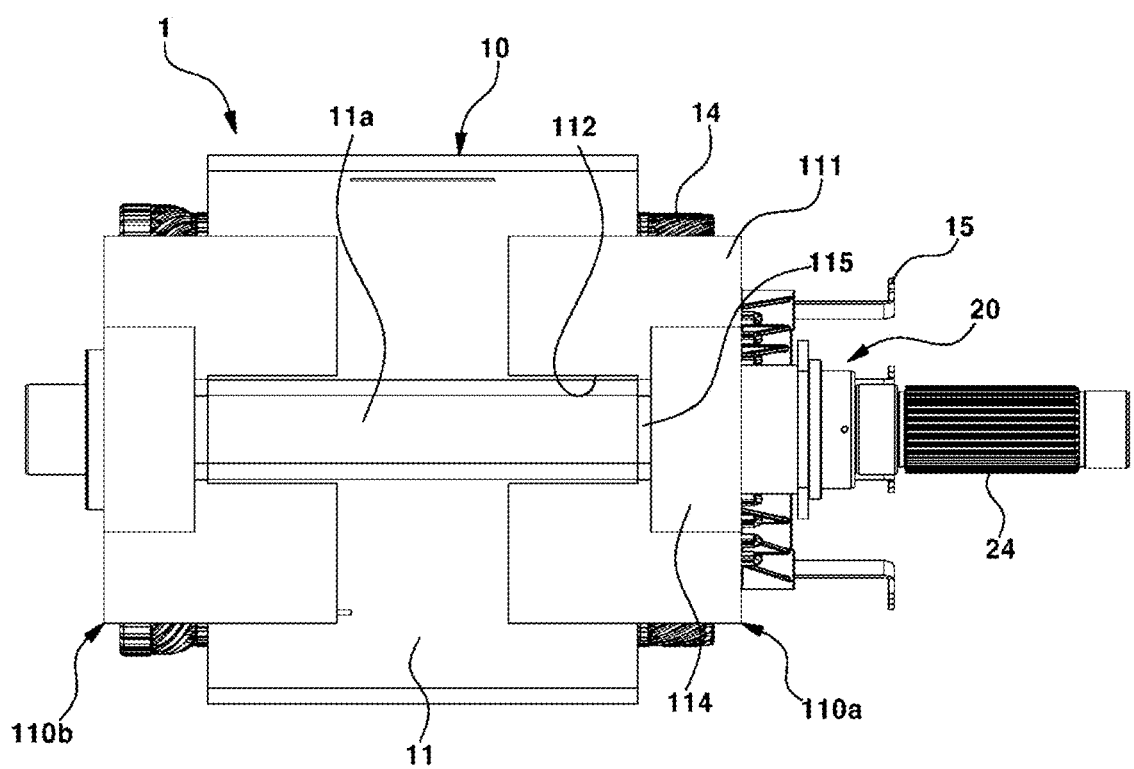

In addition, FIGS. 7 to 10 are views showing a state in which oil holders are installed in the motor according to embodiments of the present invention, wherein FIG. 7 is a perspective view showing the stator 10, the rotor 20, and the oil holders 110*a* and 110*b*, FIG. 8 is a side view, FIG. 9 is a front view, and FIG. 10 is a bottom view.

In FIGS. 7 to 10, an illustration of the housing (denoted by reference numeral "30" in FIG. 6) of the motor 1 is omitted. Since the motor parts such as the stator 10, the rotor 20, and the like are accommodated in the inner space of the housing, as may be seen in FIG. 6, the housing 30 is located outward to surround the stator 10 and the rotor 20.

In addition, an illustration of the injection pipes is also omitted in FIGS. 7 to 10, and the injection pipes (denoted by reference numerals "101" and "102" in FIGS. 1 to 3) may be referred to FIGS. 1 to 3. In the embodiments of the present invention, additional injection pipes may be further installed, differently from FIGS. 1 to 3.

For example, in FIGS. 1 to 3, the injection pipes 101 and 102 are disposed lengthwise along a front and rear direction of the motor on the left and right sides of the side above the stator 10, respectively. However, an injection pipe, which is disposed lengthwise along a front and rear direction of the motor, may be further installed in the center between the left side and the right side. In this case, the injection pipes in the left, the right, and the center are all arranged side by side.

In addition, each of the injection pipes 101 and 102 is provided with holes capable of spraying the oil at a predetermined interval along the front and rear longitudinal direction, and the oil transferred by being pressurized by the oil pump (not shown) may be sprayed toward the stator 10 through the holes in the injection pipes.

Reference numeral "15" denotes bus bars each used for electrical connection of each coil by being connected to each coil 14 of the stator 10, and the bus bars 15 may be located at the front portion of the motor 1.

In addition, reference numeral 11*a* denotes a housing connection portion of the stator core 11, and the housing connection portion 11*a* is a portion where the stator core 11 is coupled to the housing 30. In addition, as is shown, the housing connection portion 11*a* is protrudingly provided on the surface of the stator core 11.

In the illustrated embodiment, the housing connection portions 11*a* may be installed with two at the upper side and one at the lower side of the stator core 11, wherein the housing connection portion 11*a* installed at the lower side may be protrudingly provided so as to be disposed lengthwise in the front and rear direction at the center of the lower end portion of the stator core 11.

In embodiments of the present invention, the oil holders 110*a* and 110*b* may be coupled and fixed to the housing connection portion 11*a* provided on the lower side of the stator core 11. That is, the front side oil holder 110*a* and the rear side oil holder 110*b* are coupled to the front end portion and the rear end portion, respectively, of the housing connection portion 11*a*.

As shown in FIG. 6, a coupling member 109 inserted into the inner side of the housing connection portion 11*a* of the stator core 11 is coupled to the housing 30 of the motor 1, whereby the stator core 11 and the oil holders 110*a* and 110*b* may be integrally fixed and mounted to the housing 30. Here, the coupling member 109 may be a long bolt or rod type coupling member that may be inserted lengthwise into the inner side of the housing connection portion 11*a*.

In this way, when the housing connection portion 11*a* of the stator core 11 and the housing 30 are coupled to each other by the coupling member 109, the oil holders 110*a* and 110b may also be coupled together to the stator core 11 and the housing connection portion 11a by the coupling member 109.

As described above, the oil holders 110a and 110b are installed on the side under the stator 10 and serve to temporarily collect the oil. As a result, at least some of the lower portion of the stator 10 and, more specifically, of the lower end portion of the stator (that is, the lower portion of the stator coil) that has been the conventional vulnerable cooling portion, may be cooled in a state of being immersed at all times into the oil.

That is, in order to obtain more superior cooling performance by using the oil sprayed through the holes of the injection pipes disposed on the side above the stator 10, the oil holders 110a and 110b having a preset height are installed on the side under the stator 10. Accordingly, the oil is collected at the inside of the oil holders 110a and 110b up to a level into which the lower end portion of the stator may be immersed.

At this time, the oil holders 110a and 110b are coupled by the coupling member 109 to the lower end portion of the stator core 11 and, more specifically, to the housing connection portion 11a of the stator core 11 as described above, thereby being fixedly installed thereto.

As a result, inside the housing 30 of the motor 1, when the oil sprayed from the injection pipes on the side above the stator 10 is collected into the additional structure, that is, the oil holders 110a and 110b, installed on the side under the stator 10 after flowing downward by gravity, the lower end portion of the stator may be immersed into the oil inside the oil holders.

As such, the oil holders 110a and 110b are structures that allow the oil falling downward from the stator 10 to temporarily stay therein so that the core portion and coil portion of the lower end portion of the stator 10 are cooled in the state of being immersed into the oil collected therein. Here, a coupling portion 115 having a through hole 116 is protrudingly provided at the lower end portion of the oil holders 110a and 110b.

As a result, the coupling portion 115 is coupled to the housing 30 of the motor 1 by the coupling member 109 in a state of being bonded to the housing connection portion 11a provided at the lower end portion of the stator core 11, whereby the oil holders 110a and 110b may be fixed to the stator 10 and the housing 30.

In an embodiment of the present invention, the oil holders 110a and 110b may be configured to include the front side oil holder 110a and the rear side oil holder 110b as described above, and each of the oil holders 110a and 110b is coupled along with the stator core 11 to the housing 30 by the coupling member 109.

The front side oil holder 110a is installed at the lower end section of the stator core 11 at the motor front side, and the rear side oil holder 110b is installed at the lower end section of the stator core 11 at the motor rear side.

Although an example in which both the front side oil holder 110a and the rear side oil holder 110b are installed has been described, the oil holder may be preemptively installed only at any one of the motor front side and the motor rear side, which is relatively vulnerable to not being cooled.

In other words, only the front side oil holder 110a may be installed or only the rear side oil holder 110b may be installed.

Figure 11:
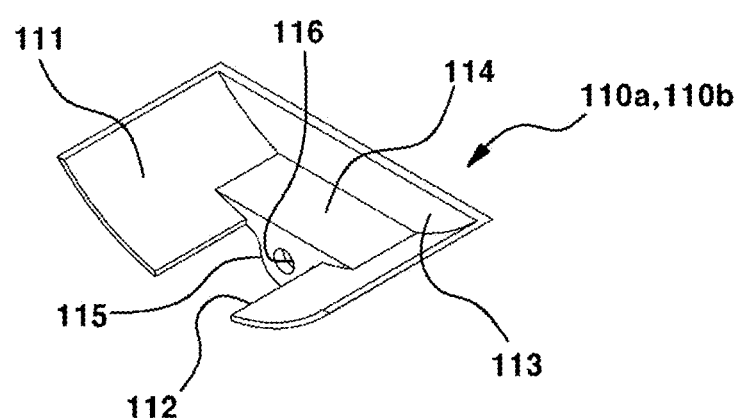
FIGS. 11 to 13 are views showing the oil holder in the motor according to an embodiment of the present invention.
Figure 12:
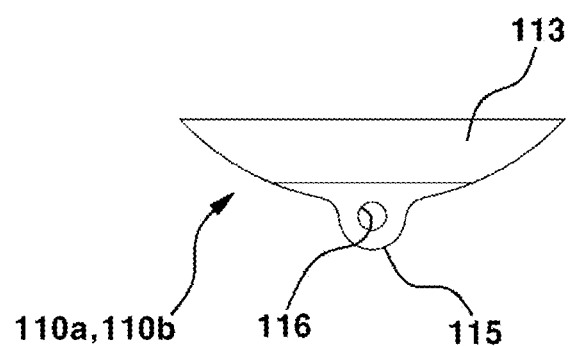
Figure 13:
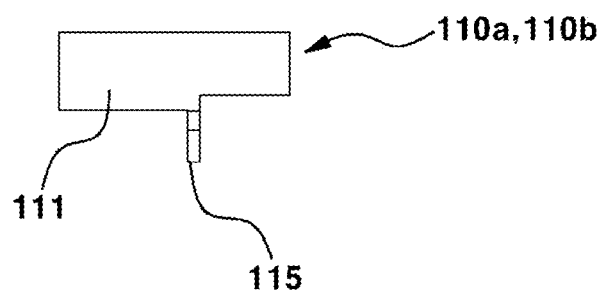

FIG. 11 is a perspective view showing the oil holder in the motor according to an embodiment of the present invention, FIG. 12 is a front view showing the oil holder in the motor according to an embodiment of the present invention, and FIG. 13 is a side view showing the oil holder in the motor according to an embodiment of the present invention.

As is shown, at least some of each of the left and right side surface portions 111 of the oil holders 110a and 110b are provided in curved surfaces that may be bonded to the outer circumferential surface of the stator core 11, and an opening portion 112 may be provided in at least some of the bottom surface portion of the oil holders 110a and 110b to allow the lower end portion of the outer circumferential surface of the stator core 11 to be exposed.

In this case, the opening portion 112 of each of the oil holders 110a and 110b is provided between the curved surface portions, which are bonded to the outer circumferential surface of the stator core 11, of the left and right side surface portions 11.

As described above, each of the oil holders 110a and 110b may be mounted to be in a state where at least some of each of the side portions 11 are provided in a curved surface, and each of the side portions 11 provided with the curved surface is bonded to the outer circumferential surface of the stator core 11, more specifically, to the lower end portion of the outer circumferential surface of the stator core 11.

In addition, as the opening portions 112 are each provided in the bottom surface portions of the oil holders 110a and 110b, it is possible to prevent the deformation of the oil holders due to the load of the oil filled inside the oil holders 110a and 110b.

In addition, at a front surface portion of the front side oil holder 110a and a rear surface portion of the rear side oil holder 110b, walls 113, in the form of blocking the lower end section of the stator core 11 and the lower end portion of the coil 14 from the front and the rear, respectively, are provided.

In each of the oil holders 110a and 110b, the wall 113 is disposed to be spaced apart from the lower end portion of the stator 10 to the front or the rear and is provided to connect space between the left and right side surface portions 111.

In addition, the bottom portion 114 in contact with the lower end portion of the wall 113 in each of the oil holders 110a and 110b may be provided of a flat surface rather than a curved surface, and the bottom portion 114 may be provided to connect space between the left and right side surface portions 11 and the wall.

The bottom portion 114 is a bottom part of a storage space in which the oil is stored in each of the oil holders 110a and 110b and is the bottom part located between the wall 113 and the lower end section of the stator core 11 in each of the oil holders 110a and 110b.

In addition, the bottom portion 114 of the front side oil holder 110a is the bottom part exposed to the front of the lower end section of the stator core 11, and the bottom portion 114 of the rear side oil holder 110b is the bottom part exposed to the rear of the lower end section of the stator core 11.

As a result, the storage space in which the oil is stored in the front side oil holder 110a becomes a space provided by some of each of the left and right side surface portions 11, which are not bonded to the outer circumferential surface of the stator core 11, the wall 113, the bottom portion 114, and the lower end section (front surface portion) of the stator core 11.

In addition, the storage space in which the oil is stored in the rear side oil holder 110b also becomes a space provided by some of each of the left and right side surface portions 111, which are not bonded to the outer circumferential surface of the stator core 11, the wall 113, the bottom portion 114, and the lower end section (rear surface portion) of the stator core 11.

In addition, in each of the oil holders 110a and 110b, at least some of the lower end portion of the stator, particularly and, in particular, of the lower end portion of the stator coil 14, remains immersed into the oil storage space.

With reference to FIGS. 7, 8, and 10, it may be seen that the stator coil 14 is wound at the rear side of the stator 10 so as to protrude rearward by a predetermined width from the rear end of the stator core 11.

Similarly, it may be seen that the stator coil 14 is wound at the front side of the stator 10 so as to protrude forward by a predetermined width from the front end of the stator core 11.

At this time, when the stator coil 14 is wound so as to protrude to the front and the rear of the stator core 11, the shape of the coil portion, which is protruded forward from the stator core 11, and the shape of the coil portion, which is protruded rearward from the stator core 11, may both be cylindrical shapes.

In addition, the oil filled in the storage space of the front side oil holder 110a is provided to be in contact with the lower end section of the stator core 11 and, at the same time, to allow the lower end portion of the part protruding forward from the core 11 in the stator coil 14 to be immersed.

Similarly, the oil filled in the storage space of the rear side oil holder 110b is provided to be in contact with the lower end section of the stator core 11 and, at the same time, to allow the lower end portion of the part protruding rearward from the core 11 in the stator coil 14 to be immersed.

In this way, the lower end section of the stator core 11 and the lower end portion of the stator coil 14 may be cooled in a state of being immersed into the oil in the storage space.

In the case that the front wall 113 of the front side oil holder 110a and the rear wall 113 of the rear side oil holder 110b are too high, the rotor 20 may also be immersed into the oil inside oil holders 110a and 110b, and additional drag may occur.

Therefore, the height of the wall 113 of each of the oil holders 110a and 110b needs to be set so as to limit the height of the oil collected in each of the oil holders 110a and 110b not to become too high.

Therefore, in order not to allow additional drag due to immersion of the rotor 20 into the oil to occur, the height of the wall of each of the oil holders 110a and 110b may be provided to be at least 2 mm lower than that of the lower end portion of the rotor 20, in consideration of the viscosity and sloshing of the oil (that is, "d≥2 mm" in FIG. 9).

Further, in the inner space of the housing 30, the bottom portion 114 of each of the oil holders 110a and 110b may be located higher than a height of the lowermost end of the lower end portion of the stator 10.

Here, the lowermost part of the lower end portion of the stator may be the housing connection portion 11a.

In addition, in embodiments of the present invention, the oil holders 110a and 110b may be made of a material having oil resistance and heat resistance, whereby corrosion, which is caused by the oil, and thermal deformation, which is due to the temperature of the oil and the temperature of the stator core 11, do not occur.

In addition, the oil holders 110a and 110b are to be made of a material having sufficient rigidity so that sagging due to the weight of the oil does not occur and may be manufactured to have a thickness of at least a predetermined level to secure the rigidity.

In addition, the size of the oil holders 110a and 110b is to be set in consideration of the clearance inside the housing 30.

Figure 14:
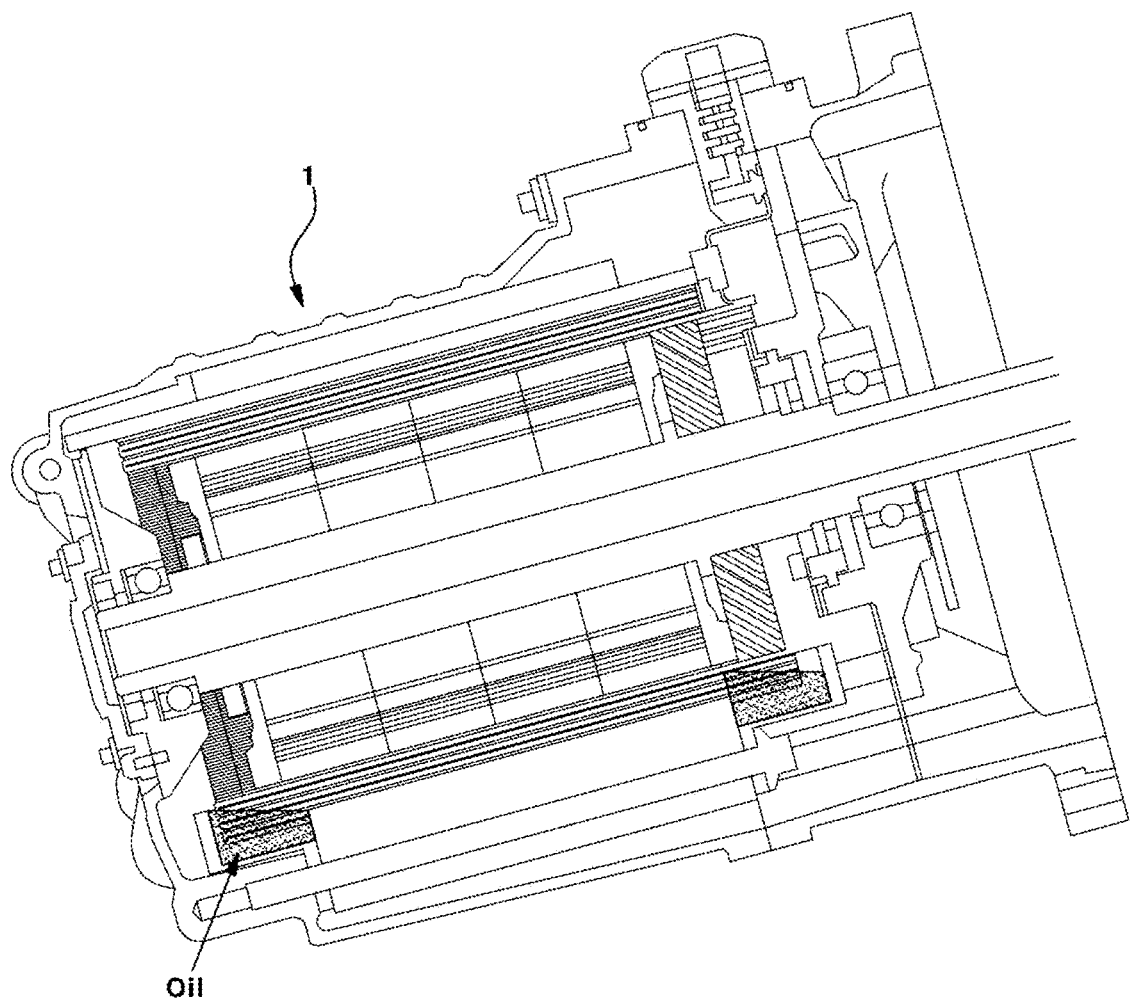
FIGS. 14 and 15 are views showing a state in which the oil is collected to at least a predetermined level by the oil holder in a state where the motor according to an embodiment of the present invention is tilted.
Figure 15:
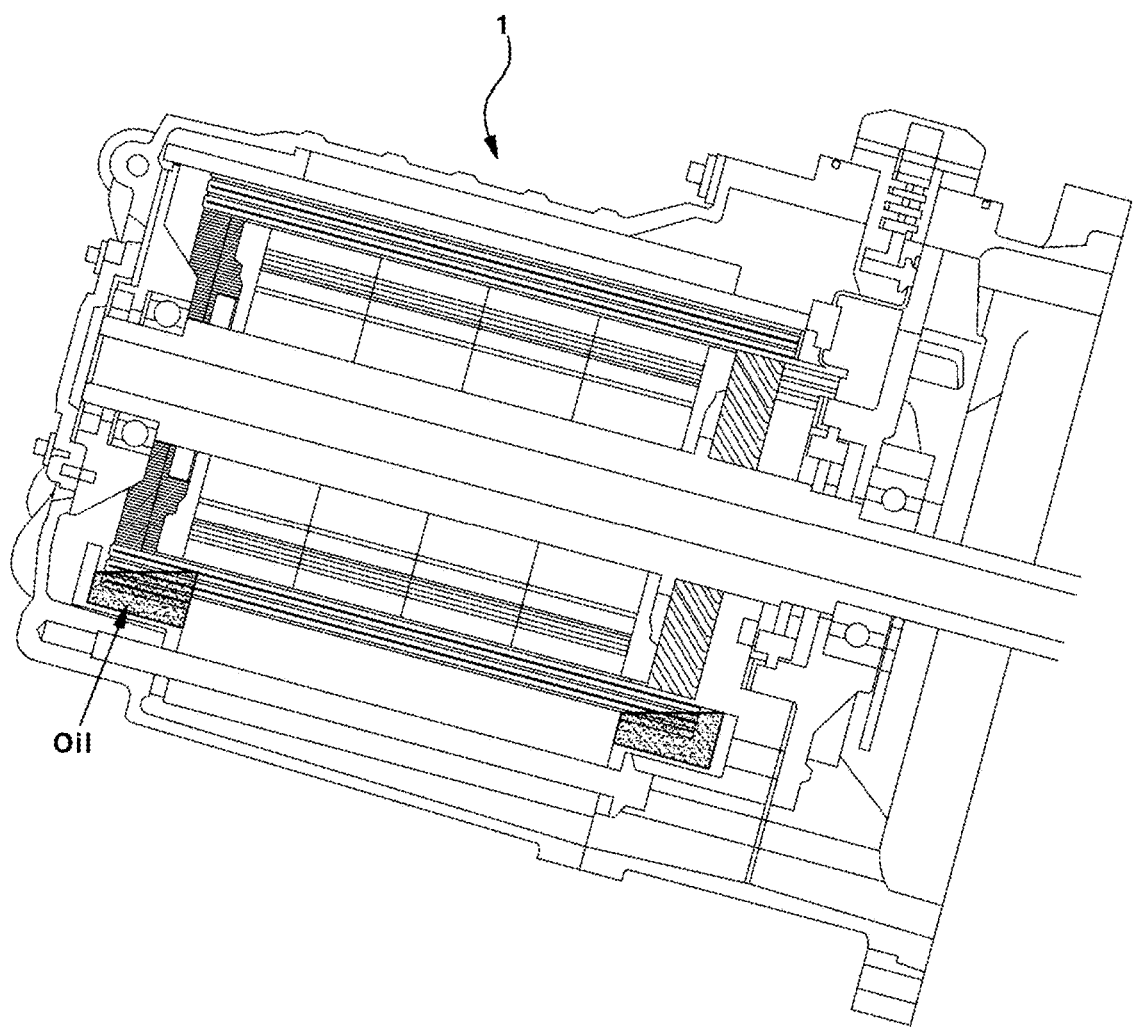

Meanwhile, FIGS. 14 and 15 are views showing a state in which the oil is collected to at least a predetermined level by the oil holders 110a and 110b in a state where the motor 1 is tilted during driving of the vehicle.

With reference to the drawings, in a state where each coupling portion 115 of the front side oil holder 110a and the rear side oil holder 110b is bonded to the front end and rear end surfaces of the housing connection portion 11a of the stator core 11, it may be seen that each of the oil holders 110a and 110b, the stator core 11, and the housing 30 are integrally coupled by the coupling member 109 such as a long bolt, which penetrates therethrough.

The oil, being flowed downward after having been sprayed from the injection pipe toward the stator core 11 and the coil 14, is collected in the storage space (inner space) of each of the oil holders 110a and 110b, wherein the storage space is provided by the left and right side surface portions 11, the wall 113, and the bottom portion 114. Therefore, even when the vehicle body and the motor are tilted, some of the lower end portion at the front and the rear sides of the stator 10 may be immersed at all times into the oil stored in each of the oil holders 110a and 110b.

Accordingly, with even a small amount of the oil, immersion into the oil may be accomplished, and cooling performance enhancement may be effectively achieved.

In a conventional case, when the motor is tilted to a forward side or rearward side, the stator coils on the opposite side of the tilted direction are not immersed into the oil in the housing, and on the tilted side, a portion of the rotor also becomes immersed into the oil in the housing, whereby motor efficiency decrease due to additional drag appears.

However, in embodiments of the present invention, even when the tilt of the motor 1 occurs as shown in FIGS. 14 and 15, the oil is not all discharged from both the front oil holder 110a and the rear oil holder 110b, and to some extent, the oil is held to at least a predetermined level.

Therefore, cooling of the stator 10 is possible by the immersion into the oil on both opposite sides, and even when the motor 1 is tilted, the height of the oil inside the oil holders 110a and 110b does not become excessively high, whereby an additional drag phenomenon, which is caused by some of the rotor 20 being immersed into the oil, may be prevented.

Embodiments of the present invention, regardless of the height of the oil for immersing inside the housing, are not affected by the design limitation (i.e., the oil height limit for preventing gear loss) of the height of the oil inside the housing due to the height of the reducer.

Therefore, in embodiments of the present invention, it is possible to implement the immersion effect even with a small amount of the oil compared to the structure for immersion using the existing housing.

Figure 16:
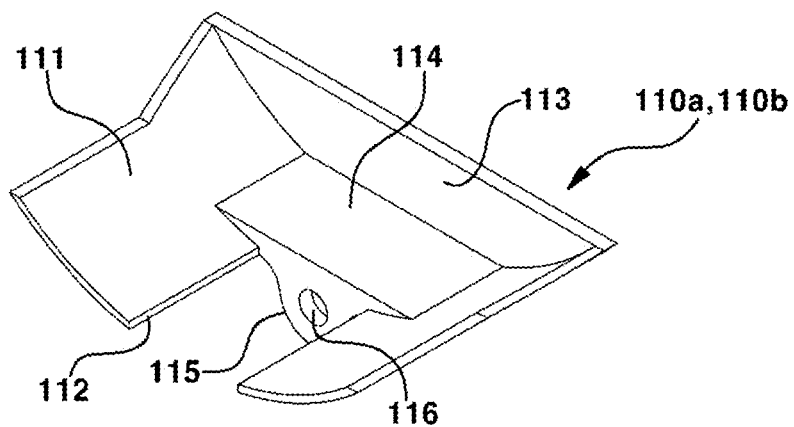
FIGS. 16 to 19 are views illustrating various modifications of the oil holder in the motor according to embodiments of the present invention.
Figure 17:
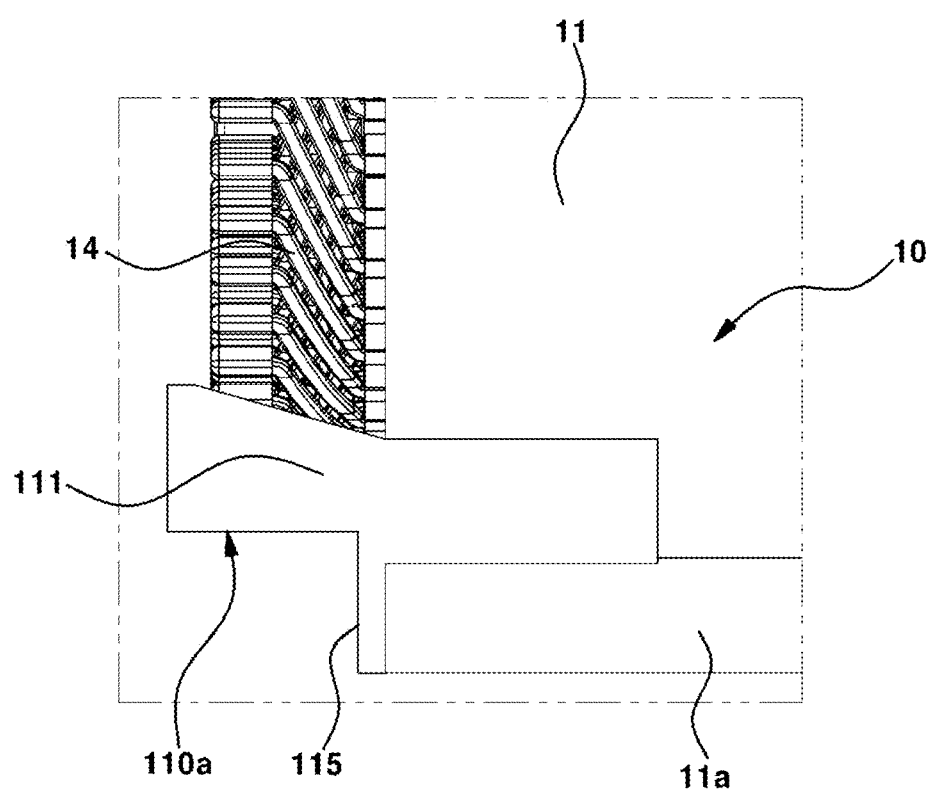

Meanwhile, FIGS. 16 to 19 are views illustrating various modifications of the oil holder in the motor according to embodiments of the present invention, and FIGS. 16 and 17 show an example having a shape that at least some of the upper end of each of the left and right side surface portions 111 of each of the oil holders 110a and 110b is tilted downward.

Figure 18:
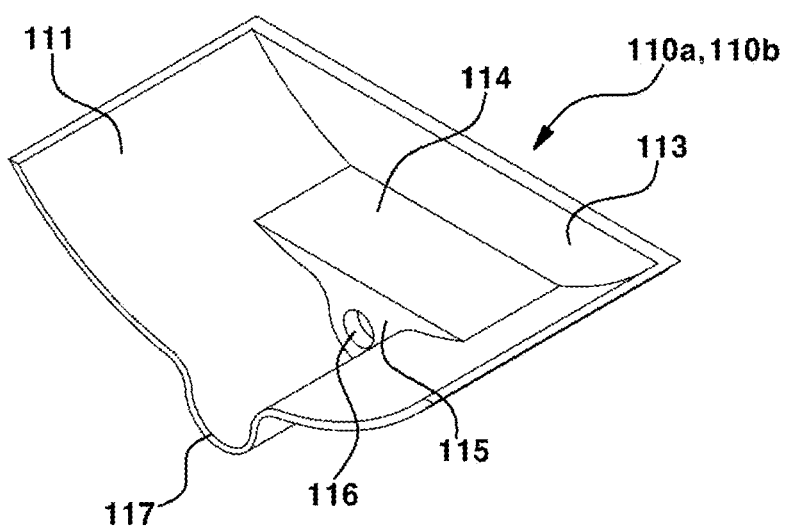
Figure 19:
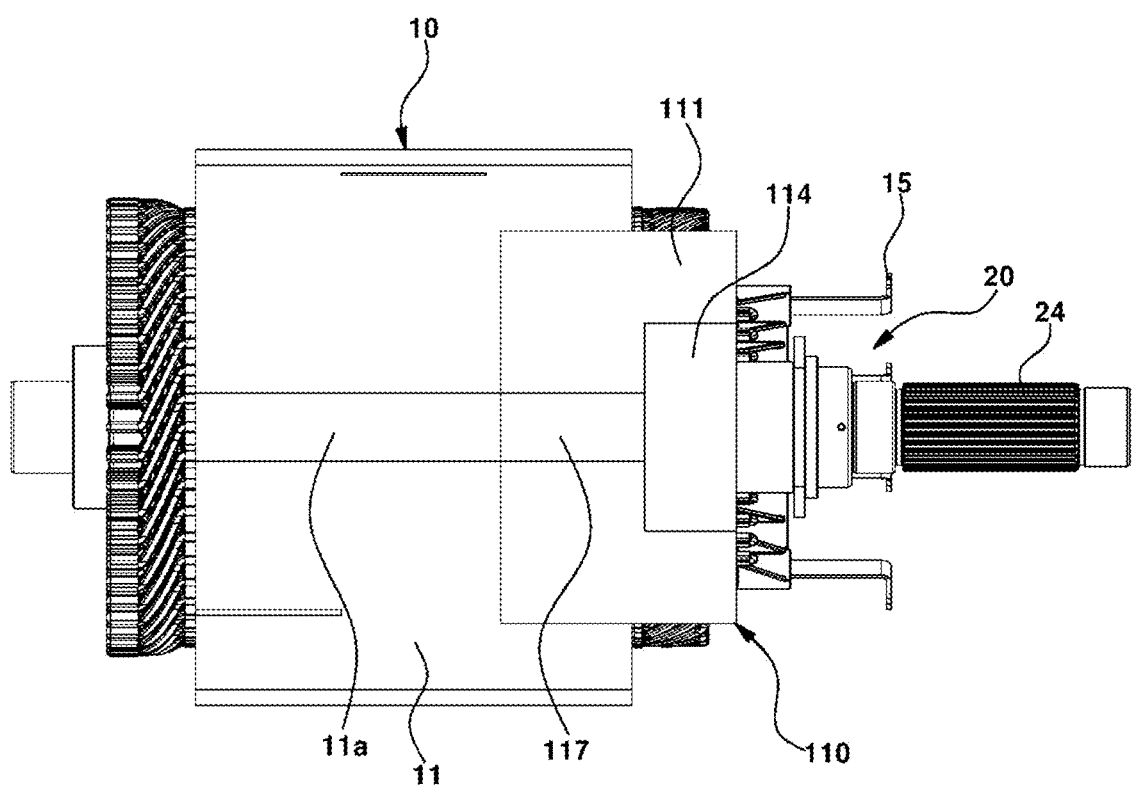

In addition, FIGS. 17 and 19 are views showing the installation state of the oil holders 110a and 110b, wherein FIG. 17 is a side view of the motor installed with the oil holder shown in FIG. 16, and FIG. 19 is a bottom view of the motor installed with the oil holder shown in FIG. 18.

When the vehicle body and the motor 1 are tilted during ascending driving or descending driving of the vehicle, the oil collected in the oil holders 110a and 110b may pass to the rotor side, and the oil passed to the rotor side may cause a phenomenon, in which the rotor is immersed into the oil, and may induce additional drag (loss) thereby.

In order to improve such a problem, as shown in FIGS. 16 and 17, by inclining an upper end of each of the side portions 11 of each of the oil holders 110a and 110b, even when the tilt of the motor occurs, the oil that may cause drag may be drained out more quickly in the inclined structure, whereby the drag that may occur on the rotor may be eliminated.

In FIGS. 18 and 19, an example is shown that each of the oil holders 110a and 110b is not provided with the opening (denoted by reference numeral "112" in FIGS. 16 and 17). Instead, each of the oil holders 110a and 110b is shown to have a bottom surface portion 117 in which the left and right side surface portions 111 extend, thereby being joined together.

As is shown, the bottom surface portion 117 extended from the left and right side surface portions 11 may be provided to be a shape corresponding to the shape of the lower end portion of the stator core 11, more specifically, the shape of the housing connection portion 11a of the stator core 11.

Accordingly, when the oil holders 110a and 110b are assembled on the side under the stator 10, the housing connection portion 11a of the stator core 11 may be accommodated into the inner side of each of the bottom surface portions 117 of the oil holders 110a and 110b. In this case, the surface of the housing connection portion 11a of the stator core 11 may be assembled to be bonded to the inner side surface of each of the bottom surface portions 117 of the oil holders 110a and 110b.

As such, existence of the bottom surface portion 117 connecting between the left and right side surface portions 111 may provide an advantage of preventing sagging of each of the oil holders 110a and 110b.

That is, in the examples of FIGS. 11 to 13, 16, and 17, while the oil holders 110a and 110b are rotated about the long bolt (coupling member) 109 and the housing connection portion 11a of the stator core 11 which are coupled to penetrate the coupling portion 115, the left side portion or the right side portion of the oil holder may be drooped down relative to the opposite side surface portion.

On the other hand, in the example of FIGS. 18 and 19, the bottom surface portion 117 connecting between the left and right side surface portions 111 is provided into a concave shape that may allow the housing connection portion 11a to be inserted and accommodated inwards, wherein the housing connection portion 11a is protrudingly shaped downward and is protrudingly provided downward at the lower end portion of the stator core 11. Accordingly, by the oil inside the oil holders 110a and 110b, a phenomenon, where the oil holder rotates around the long bolt 109 and the housing connection portion 11a of the stator core 11 or droops down to the left side or right side, may be prevented.

Although the embodiments of the present invention have been described in detail above, the scope of the present invention is not limited thereto. Further, various modifications and improvements of those skilled in the art using the basic concepts of the present invention defined in the following claims are also included in the scope of the present invention.

What is claimed is:

1. A motor, comprising:
   a cooling system configured to cool a stator having a stator coil wound around a stator core,
   wherein the cooling system includes oil holders installed on a side under the stator in an inner space of a motor housing and provided to allow oil to be collected up to a level capable of allowing at least some of a lower end section of the stator to be immersed for cooling;
   wherein the oil holders include a front side oil holder installed on a lower end section of the stator core at a motor front side and a rear side oil holder installed on a lower end section of the stator core at a motor rear side;
   wherein the front side oil holder and the rear side oil holder are formed independently from each other;
   wherein each of the oil holders includes opposite side surface portions, a wall provided to connect between the opposite side surface portions and located to be spaced apart from the lower end section of the stator, and a bottom portion provided to connect between the opposite side surface portions and the wall and located between the lower end section of the stator and the wall to provide a bottom of a space configured to store the oil; and
   wherein the wall has a shaped configured to radially block a lower end section of the stator core when viewed in an axial direction, and a lower end portion of the stator coil at a front or a rear of the stator coil, and has a radial height lower by a predetermined dimension than a radial height of a lower end portion of a rotor.

2. The motor of claim 1, wherein the cooling system is provided with holes, the motor further including a plurality of injection pipes configured to spray the oil to the stator through the holes.

3. The motor of claim 1, wherein:
   the front side oil holder is installed to allow a coil portion protruding forward from the core of the lower end section of the stator to be immersed for cooling into the oil stored inside the front side oil holder; and
   the rear side oil holder is installed to allow a coil portion protruding rearward from the core of the lower end section of the stator to be immersed for cooling into the oil stored inside the rear side oil holder.

4. The motor of claim 1, wherein at least one of the oil holders is installed on the lower end section of the stator core at one of a motor front side and a motor rear side, and installed to allow a corresponding coil portion protruding forward and protruding rearward from the core of the lower end section of the stator to be immersed for cooling into the oil stored inside the oil holder.

5. The motor of claim 1, wherein at least some of each of the opposite side surface portions are provided in a curved surface capable of being bonded to an outer circumferential surface of the stator core.

6. The motor of claim 5, wherein an opening portion is provided in a lower surface portion of each of the oil holders to allow a lower end portion of the outer circumferential surface of the stator core to be exposed.

7. The motor of claim 6, wherein the opening portion is provided between curved surface portions of the opposite side surface portions, the curved surface portions being bonded to the outer circumferential surface of the stator core.

8. The motor of claim 5, wherein:
   a housing connection portion of the stator core coupled to the motor housing is provided in a protruding shape on a lower end portion of the stator core; and a lower surface portion of at least one of the oil holders has a concave shape capable of allowing the housing connection portion to be inserted thereinto and coupled thereto.

9. The motor of claim 8, wherein the oil holder is installed to allow a surface of the housing connection portion of the stator core to be bonded to an inner surface of the lower portion of the concave shape.

10. The motor of claim 8, wherein the lower portion of the concave shape of the oil holder and the housing connection portion of the stator core are disposed lengthwise in a front-rear direction of the motor.

11. The motor of claim 8, wherein a lower surface portion of the concave shape in the oil holder is provided between curved surface portions of the opposite side surface portions, the curved surface portions being bonded to the outer circumferential surface of the stator core.

12. The motor of claim 1, wherein the bottom portion of at least one of the oil holders in the inner space of the motor housing is located higher than a height of the lowermost end of a lower end portion of the stator.

13. The motor of claim 1, wherein at least one of each of the opposite side surface portions of the oil holders has a shape tilted downward.

14. A cooling system for cooling a stator having a coil wound around a core, the cooling system comprising:
    a motor housing; and
    at least one oil holder installed on a side of an inner space of the motor housing under the stator, the at least one oil holder configured to allow oil to be collected up to a level capable of allowing at least some of a lower end section of the stator to be immersed for cooling, wherein the at least one oil holder comprises:
    opposite side surface portions;
    a wall provided to connect between the opposite side surface portions and located to be spaced apart from the lower end section of the stator; and
    a bottom portion provided to connect between the opposite side surface portions and the wall and located between the lower end section of the stator and the wall to provide a bottom of a space configured to store the oil, the bottom portion being located higher than a height of a lowermost end of a lower end portion of the stator.

15. The cooling system of claim 14, wherein the at least one oil holder comprises:
    a front side oil holder installed on a lower end section of the core of the stator at a front side of a motor, the front side oil holder configured to allow a coil portion protruding forward from the core of the stator to be immersed for cooling into the oil stored inside the front side oil holder; and
    a rear side oil holder installed on a lower end section of the core of the stator at a rear side of the motor, the rear side oil holder configured to allow a coil portion protruding rearward from the core of the stator to be immersed for cooling into the oil stored inside the rear side oil holder.

16. The motor of claim 1, wherein:
    a housing connection portion having a protruding shape on a lower end portion of the stator core is coupled to the motor housing;
    a coupling portion is provided in at least one of the oil holders; and
    in a state in which the coupling portion of the at least one of the oil holders is bonded to the housing connection portion of the stator core, a coupling member penetrating a through hole provided in the coupling portion and the housing connection portion is coupled to the motor housing so that the stator core, the at least one of the oil holders, and the motor housing are fixed to each other.

17. A motor, comprising:
    a cooling system configured to cool a stator having a coil wound around a stator core;
    wherein the cooling system includes oil holders installed on a side under the stator in an inner space of a motor housing and provided to allow oil to be collected up to a level capable of allowing at least some of a lower end section of the stator to be immersed for cooling;
    wherein a housing connection portion having a protruding shape on a lower end portion of the stator core, is coupled to the motor housing;
    wherein a coupling portion is provided in at least one of the oil holders; and
    wherein, in a state in which the coupling portion of the at least one of the oil holders is bonded to the housing connection portion of the stator core, a coupling member penetrating a through hole provided in the coupling portion and the housing connection portion is coupled to the motor housing so that the stator core, the at least one of the oil holders, and the motor housing are fixed to each other.

18. The motor of claim 17, wherein the cooling system is provided with holes, the motor further including a plurality of injection pipes configured to spray the oil to the stator through the holes.

19. The motor of claim 17, wherein:
    a front side oil holder is installed to allow a coil portion protruding forward from the core of the lower end section of the stator to be immersed for cooling into the oil stored inside the front side oil holder; and
    a rear side oil holder is installed to allow a coil portion protruding rearward from the core of the lower end section of the stator to be immersed for cooling into the oil stored inside the rear side oil holder.

20. The motor of claim 17, wherein at least one of the oil holders is installed on the lower end section of the stator core at one of a motor front side and a motor rear side, and installed to allow a corresponding coil portion protruding forward and protruding rearward from the core of the lower end section of the stator to be immersed for cooling into the oil stored inside the oil holder.

* * * * *